United States Patent [19]
Stevko et al.

[11] 3,728,023
[45] Apr. 17, 1973

[54] EXPOSURE CONTROL FOR ELECTROSTATIC COPIERS

[75] Inventors: Phillip J. Stevko, Euclid; Joseph L. Petrella, Cleveland; Gerald A. Dissauer, South Euclid, all of Ohio

[73] Assignee: Addressograph-Multigraph Corporation, Cleveland, Ohio

[22] Filed: Oct. 14, 1971

[21] Appl. No.: 189,288

[52] U.S. Cl..................355/83, 250/219 FR, 355/3, 355/68, 355/70
[51] Int. Cl............................................G03b 27/78
[58] Field of Search..........................355/83, 103, 99, 355/68, 69, 70, 38; 250/205, 219 FR

[56] References Cited

UNITED STATES PATENTS 3,609,038  9/1971  Koishorn..........................355/69 X
2,995,978  8/1961  Glandon et al...................250/205 X Primary Examiner—Samuel S. Matthews
Assistant Examiner—Richard L. Moses
Attorney—Russell L. Root et al.

[57] ABSTRACT

An exposure control for contact copiers wherein an original document is moved on a path of travel first to an illumination intensity measuring and control station and thence to an exposure station. Illumination means are provided to direct a first quantum of light across the path of travel at the measuring and control station and a second quantum of light at the exposure station. Light intensity measuring and control means, including electrical circuity, are provided at the measuring and control station to sense the intensity of light passing through the original document and change the emitted intensity of the first quantum of light to provide a selected sensed intensity thereof. The emitted intensity of the second quantum of light is also changed directly proportional to the change in the emitted intensity of the first quantum. Means are also provided to maintain the emitted intensities while the original document is transferred from the measuring and control station to the exposure station.

14 Claims, 2 Drawing Figures

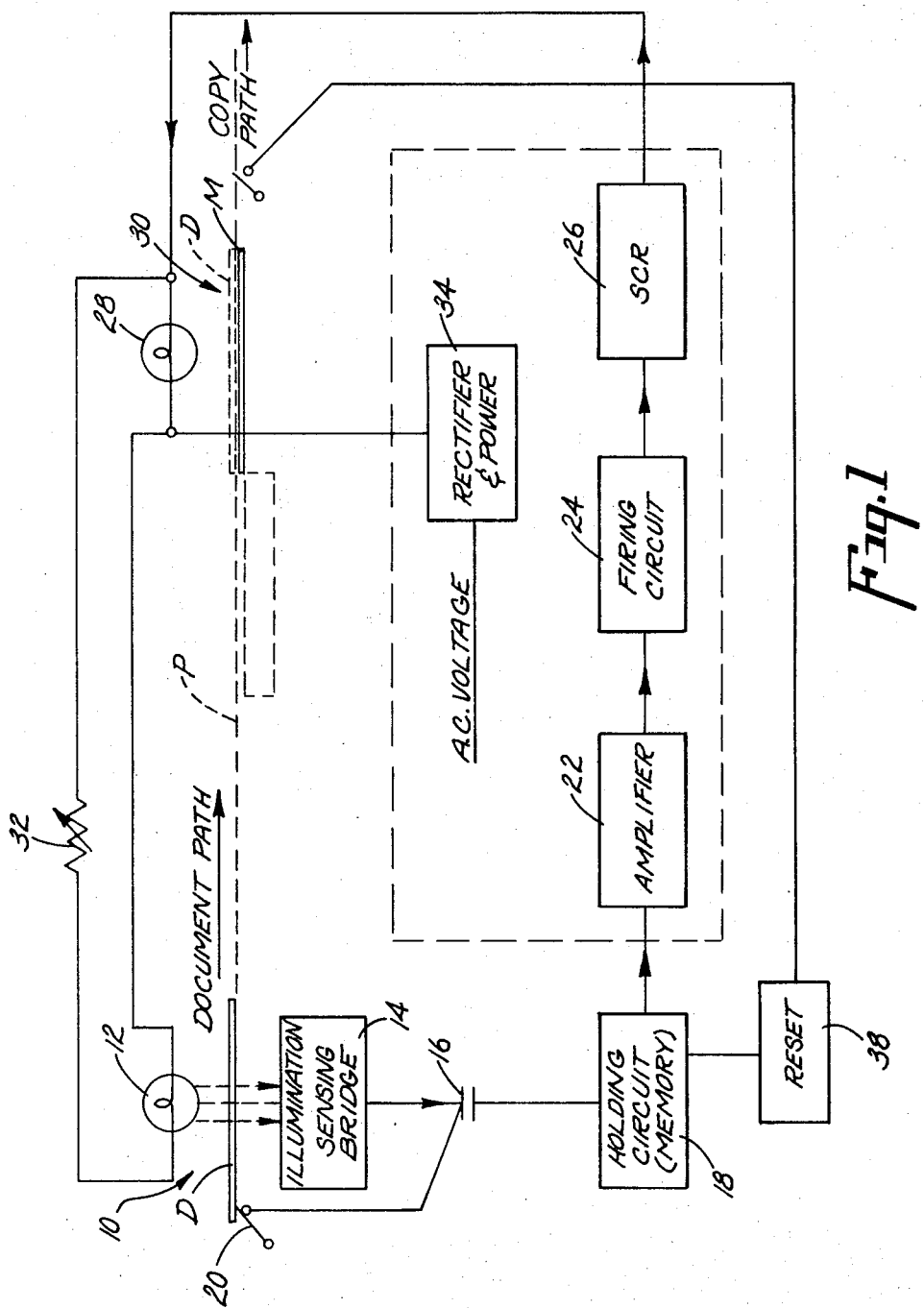

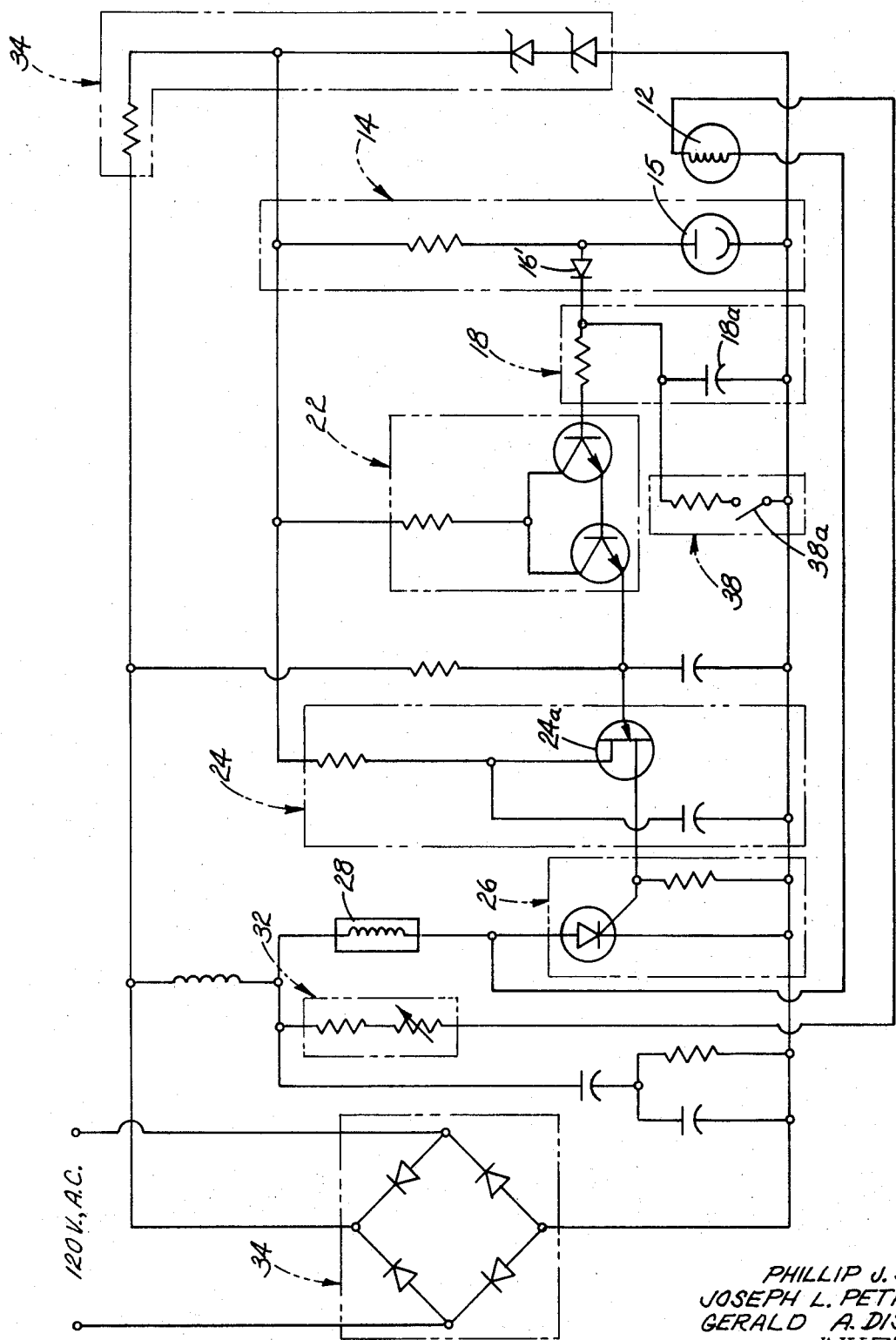

EXPOSURE CONTROL FOR ELECTROSTATIC COPIERS

This invention relates generally to exposure control for electrostatic contact copiers, and more particularly to an apparatus and method for controlling the intensity of the light energy generated for the proper illumination through varying thicknesses and/or densities, and/or colors of original document sheets to be copied onto a respective copy sheet, to give uniform intensity on the copy sheet irrespective of the thickness and density and color of the original document sheet.

BACKGROUND OF THE INVENTION

In the process of producing contact electrostatic copies, an original document having the information thereon to be copied is brought into contact with the copy sheet and light is directed upon the original document and passes therethrough, exposing the copy sheet. The copy sheet has a coating of zinc oxide, which zinc oxide has an electrostatically charged surface. Wherever the light strikes this surface, the charge on the copy sheet is dissipated, but where the surface of the copy sheet is shielded from the light, (i.e., at the location of the data on the original document), the charge on the copy sheet is not dissipated. Toner is then applied which adheres to the surface of the copy sheet where the charge remains, thus forming the image on the copy sheet. The toner is then fused to produce a final form of the copy sheet.

In this process of exposing a sheet surface to illumination for purposes of copying, it is necessary that the intensity of the light striking the copy sheet be so controlled that it is just sufficient to dissipate the charge in the nonimaged areas of the copy sheet, but not so intense as to pass through the data areas of the original document, which would partially discharge the imaged areas on the copy sheet and thus resulting in a weak or broken final image on the copy sheet.

Controlling the intensity of the light passing through the original document is not a particularly difficult problem if all of the original documents sheets are of uniform color and thickness and density. However, the color and density and thickness of the original documents to be copied may vary substantially from document to document. Thus with original documents of different color density and thickness, a different intensity of light impinging on each original document must be provided in order to provide a uniform intensity of light impinging on the copy sheet.

Prior to this invention, complex servo-mechanisms and/or sampling techniques have been provided for varying light intensities for various applications, but none of these have been proved entirely satisfactory to the necessary speed of production and economy of equipment with the necessary precise control for the electrostatic copying art.

SUMMARY OF THE INVENTION

According to the present invention, an apparatus and method for controlling the intensity of the illumination to provide uniform exposure of a copy sheet is provided wherein the original document passes along a path of travel first to an illumination intensity measuring and control station, and thence to an exposure station. Illumination means are provided to direct a first quantum of light across the path of travel at the measuring and control station and a second quantum of light to the exposure station. Measuring and control means are provided at the measuring and control station to measure the intensity of the first quantum of light as it passes through the original document and change the emitted intensity of this first quantum of light to provide a preselected sensed intensity thereof. Means are also provided to vary the emitted intensity of the second quantum of light directly proportional to the change of intensity of the first quantum of light. Means are also provided to maintain the emitted intensities while the sheet is being transferred from the measuring and control station to the exposure station and maintained at the exposure station for copying.

IN THE DRAWINGS

FIG. 1 is a diagrammatic representation in block form of one embodiment of a device according to this invention; and FIG. 2 is a circuit diagram of the device depicted in FIG. 1.

DESCRIPTION OF THE PREFERRED EMBODIMENT

Referring to the drawings, and for the present to FIG. 1, a diagrammatic representation in block diagram form is shown depicting a device for controlling the intensity of illumination at an exposure station for exposing a copy sheet in a contact copying apparatus.

The apparatus has an original document path of travel shown in dotted outline and designated as P. The document D to be copied moves from left to right on this path as it is introduced into the machine. The means for engaging and moving the document are not shown as they do not per se constitute any portion of this invention.

On the document path of travel, the original document first passes to an intensity measuring and control station designated generally as 10. The intensity measuring and control station 10 includes a control lamp 12 on one side of the path P and an illumination sensing bridge 14 on the opposite side of the path P. The illumination sensing bridge 14 preferably includes a photocell 15, shown in FIG. 2, which will measure the intensity of the illumination which strikes the photocell. The illumination sensing bridge 14 is connected through a relay contact 16 (FIG. 1) to a holding circuit 18 (FIG. 1). The relay contact 16 may be operable by a switch 20 placed in the path of travel P at the intensity measuring and control station 10. When an original document D is at the intensity measuring and control station 10, it will operate the switch 20 to close the relay contact thus electrically connecting the illumination sensing bridge 14 with the holding circuit 18. When the document D leaves the intensity measuring and control station 10 on the path of travel P, it will disengage the switch 20 which will cause the relay contact 16 to open. This will hold or "freeze" the sensed condition sensed by the illumination sensing bridge 14.

The holding circuit 18 is connected to an amplifier 22 which is connected to a firing circuit 24 which in turn is connected to a silicon controlled rectifier (SCR) 26. The SCR 26 is connected to an exposure lamp 28 which is disposed at an exposure station 30.

The SCR is also connected to the control lamp 12 through a variable resistor 32 which serves to set the operating point of the illumination detection bridge 14.

The power is supplied to the system by means of a rectifier 34 which is connected to the necessary electrical components to supply the electrical power thereto for operation thereof.

At the exposure station 30, a copy sheet designated as M is fed from a source, to match with the document in superimposed relationship for exposure to form an electrostatic image in the manner aforedescribed.

The operation of the apparatus is as follows: With a document D at the intensity measuring and control station 10, the control lamp 12 directs its quantum of light through the document D onto the photocell 15 (FIG. 2) of the illumination sensing bridge 14. The amount of light sensed by the illumination sensing bridge 14 is transmitted as a signal through closed relay contact 16 to the holding circuit 18. This signal is then sent to the amplifier 22, the firing circuit 24, and the SCR 26 back to the control lamp 12. This closed loop will vary the intensity of the control lamp 12 in response to the signal received from the holding circuit.

It will be seen that the resistance of the photocell 15 of the illumination sensing bridge 14 will vary according to the amount of light transmitted through original document D. If too much light is transmitted through the original document D, the photocell resistance drops. This results in a low charge on the holding circuit capacitor 18a, (FIG. 2). Accordingly, the resultant output from the amplifier 22 will be low and the unijunction 24a of the firing circuit 24 fires at a high voltage level. The SCR 26 will be triggered late in the rectified A.C. cycle, and the voltage on the control lamp 12 reduced, causing a lower quantum of light to be transmitted through the original document D. Accordingly, the resistance of the photocell 15 will rise and the charge on the capacitor 18a will increase. The output of the amplifier 22 will thus increase and the unijunction 24a will fire earlier in the cycle, resulting in earlier triggering of the SCR 26. The brightness of the control lamp 12 will increase until stabilization occurs. This stabilization will occur when a preselected charge exists on the capacitor 18a of the holding circuit 18. After stabilization, the relay contact 16 is opened and the original document D is moved to the exposure station 30. The open relay contact prevents any change in the holding circuit 18 (i.e. memory) until after completion of the exposure of the copy sheet M at the exposure station.

Thus it will be seen that there is provided a negative feedback feature to the circuit, which will vary the control lamp 12 to produce a specific sensed illumination level in the illumination sensing bridge. Hence, irrespective of the variation in thickness, density and color of the document D, at the intensity measuring and control station 10, the intensity of the control lamp 12 will be varied to produce an even, constant illumination intensity of the quantum of the light passing through the document D and striking the photocell 15 of the illumination sensing bridge 14.

Also connected to the holding circuit 18, the amplifier 22, the firing circuit 24, and the SCR 26 is the exposure lamp 28. Hence, it also receives the same signal in a negative feedback manner as the control lamp 12 and so its intensity also will vary in the same manner as the intensity of the control lamp 12. Thus the negative feedback circuitry will change the intensity of the exposure lamp 28 in the same manner that the control lamp 12 is changed. This means that the amount of the illumination passing through the original document D at the exposure station 30 will be constant since it is controlled to a constant at the illumination sensing bridge 14. Thus irrespective of the thickness, opacity, density or color of the document D, the copy sheet will receive the same light intensity for exposure. The aforementioned open relay contact 16 preventing change in the holding circuit or memory, insures that the power level to the lamps 12 and 28 remains constant, and therefore the light intensity remains constant throughout the exposure at station 30.

In order to control the exact set point of this intensity, a variable resistor 32 is provided which can be changed to precisely select the exact intensity desired, which intensity will be maintained as aforedescribed for both the control lamp 12 and the exposure lamp 28. In this arrangement, it is necessary that the lamps 12 and 28 be of the same general type or have similar characteristics so that as the feedback signal controls the lamps by adjustment of the power input thereto, they will vary in a similar manner and have similar emission responses.

The circuit diagram shown in FIG. 2 functionally fulfills the requirements of the block diagram circuit shown in FIG. 1 and operates as aforedescribed. Each of the separate blocks of FIG. 1 is identified in FIG. 2 by phantom lines outlining the various components thereof. With respect to those components in FIG. 2 not enclosed by phantom lines, these are for the purpose of controlling the circuit as to "noise" etc. The relay contact 16 of FIG. 1 takes the form of a diode 16' in FIG. 2 which performs the function of electrically coupling the illumination sensing bridge 14 to the holding circuit 18.

In the preferred embodiment, two separate lamps are used, one a control lamp and the other an exposure lamp. However, it is possible for a single lamp to be utilized with a mirror and lens system or light pipes directing a quantum of the light energy to the illumination sensing bridge and a quantum to the exposure station.

Upon completion of the exposure at the exposure station 30, the holding circuit must be reset before the next original document is inserted at the measuring and control station. One arrangement for accomplishing this is illustrated in FIG. 2 wherein a suitable reset circuit 38 is provided, including normally open contact 38a, which is adapted for closing upon completion of the exposure at exposure station 30, to discharge capacitor 18a of holding circuit 18. With such a reset circuit, it would be preferable to utilize the relay contact 16 of FIG. 1 to connect the illumination sensing bridge circuit to the holding circuit 18 rather than the diode 16' shown in FIG. 2.

From the foregoing description and accompanying drawings, it will be seen that the invention provides an apparatus and method for use with contact copiers for controlling the intensity of the illumination to provide for uniform exposure of a copy sheet, and wherein an original document passes along a path of travel first to an illumination intensity measuring and control station, and thence to an exposure station, and wherein illumination means are provided to direct a first quantum of light across the path of travel at the measuring and control station and a second quantum of light to the exposure station, with the apparatus including measuring and control means at the measuring and control station to measure the intensity of the first quantum of light as it passes through the original document and change the emitted intensity of this first quantum of light to provide a preselected sensed intensity thereof, together with means to vary the emitted intensity of the second quantum of light directly proportional to the change of intensity of the first quantum of light. Means are also provided for maintaining the emitted intensities while the original document is being transferred from the measuring and control station to the exposure station and maintaining the same at the exposure station until completion of the copying.

The terms and expressions which have been used are used as terms of description and not of limitation, and there is no intention in the use of such terms and expressions of excluding any equivalents of any of the features shown or described, or portions thereof, and it is recognized that various modifications are possible within the scope of the invention claimed.

What is claimed is:

1. Apparatus for controlling the intensity of illumination to provide uniform exposure of a light sensitive copy sheet through an original document in a contact electrostatic copying apparatus wherein different types of original documents are copied comprising, means to establish a path of travel of said original document first to an illumination intensity measuring and control station and thence to a downstream exposure station whereat the original document is in superimposed relation with the copy sheet, illumination means disposed on one side of said path to direct a first quantum of light across said path of travel and through said original document at said measuring and control staion and other illumination means disposed on one side of said path to direct a second quantum of light across said path of travel and through said original document at said exposure station, measuring and control means disposed on the opposite side of said path and positioned to intercept and measure the intensity of light from said first quantum as it passes through said original document and to produce a signal representative of the intensity of said light, means connected to the illumination means and responsive to said signal to change the emitted intensity of the light of said illumination means at said measuring and control station and change said second quantum of light proportional thereto to provide a preselected sensed intensity of light at said exposure station, and means to maintain the emitted intensities while said original document is being transferred from said measuring and control station to said exposure station and while maintained at said exposure station.

2. Apparatus as defined in claim 1 wherein said illumination means disposed to direct the quanta of light includes first and second lamps of similar emission characteristics each connectable to said measuring and control means, said first lamp being positioned to direct its illumination toward said illumination intensity measuring and control station and said second lamp being positioned to direct its illumination toward said exposure station.

3. Apparatus as defined in claim 1 wherein said illumination means includes a lamp of similar emission characteristics at each of said stations, said lamps being connected in parallel.

4. Apparatus as defined in claim 2 further characterized by means to vary the selected sensed intensity of said first quantum of light.

5. Apparatus as defined in claim 2 wherein said measuring and control means includes a photocell, said first quantum of light being adapted to control the resistance of said photocell, and said means to maintain the emitted intensities comprising a holding circuit including capacitance means adapted for coupling in circuit with said photocell, the charge on said holding circuit being responsive to the resistance of said photocell.

6. Apparatus as defined in claim 5 wherein said holding circuit is coupled in electrical circuit with said photocell by switch means, said switch means being automatically actuated to on condition by said original document when the latter is disposed at the first mentioned station.

7. Apparatus as defined in claim 6 wherein said switch means includes means for automatically actuating said switch means to off condition upon movement of said original document from said first mentioned station, to electrically uncouple said photocell from said holding circuit.

8. Apparatus as defined in claim 5 wherein said holding circuit is coupled in electrical circuit with said photocell by a diode.

9. Apparatus in accordance with claim 6 wherein said switch means includes relay means.

10. Apparatus in accordance with claim 5 including reset means electrically coupled to said holding circuit for resetting said holding circuit after completion of the exposure of said master sheet at said exposure station.

11. Apparatus in accordance with claim 10 wherein said reset means includes means to automatically reset said holding circuit upon movement of said master sheet away from said exposure station after exposure thereof.

12. Apparatus in accordance with claim 5 wherein said means to change the emitted intensity comprises amplifier means, firing circuit means and SCR means coupled in circuit with one another and with said holding circuit and said illumination means.

13. Apparatus in accordance with claim 12 wherein said amplifier means includes a two stage amplifier.

14. Apparatus in accordance with claim 12 wherein said firing circuit means includes a unijunction transistor.

* * * * *